United States Patent [19]

Hereda et al.

[11] Patent Number: 4,478,795

[45] Date of Patent: Oct. 23, 1984

[54] ALUMINUM TRIHYDROXIDE DELIQUORING WITH ANIONIC POLYMERS

[75] Inventors: Maryellen Hereda, Budd Lake; Stephen A. Fischer, South Amboy, both of N.J.

[73] Assignee: Diamond Shamrock Chemicals Company, Dallas, Tex.

[21] Appl. No.: 434,934

[22] Filed: Oct. 18, 1982

[51] Int. Cl.$^3$ ................................................. C01F 7/06
[52] U.S. Cl. ..................................... 423/127; 423/121; 423/111; 210/732; 210/733; 210/734; 210/778
[58] Field of Search .................... 423/111, 122, 127; 210/732, 733, 734, 778

[56] References Cited

U.S. PATENT DOCUMENTS

| | | | |
|---|---|---|---|
| 3,023,162 | 2/1962 | Fordyce et al. | 423/119 |
| 3,284,393 | 11/1966 | Vanderhoff et al. | |
| 3,390,959 | 7/1968 | Sibert | 423/119 |
| 3,975,496 | 8/1976 | Smalley et al. | 423/121 |
| 4,014,985 | 3/1977 | Haleen et al. | 423/121 |
| 4,022,731 | 5/1977 | Schmitt . | |
| 4,022,736 | 5/1977 | Schmitt . | |
| 4,077,930 | 3/1978 | Lim et al. . | |
| 4,385,903 | 5/1983 | Moriyama et al. | 423/127 |

FOREIGN PATENT DOCUMENTS 1230332 4/1971 United Kingdom ................ 423/122

OTHER PUBLICATIONS

Kirk and Othmer, Encyclopedia of Chemical Technology, vol. 1, First Edition, 1947, pp. 600–602.
Kirk-Othmer, Encyclopedia of Chemical Technology, vol. 2, 1978, Third Edition, pp. 140–143.

Primary Examiner—Herbert T. Carter
Attorney, Agent, or Firm—Leslie G. Nunn, Jr.

[57] ABSTRACT

During the final stages of Al(OH)$_3$ production, deliquoring the aluminum trihydroxide slurry of excess sodium ions in the form of caustic liquor is conventionally achieved by numerous water washes prior to drying the product. Addition of an effective amount of highly charged, high molecular weight anionic polymer flocculant to the aluminum trihydroxide slurry improves the filtration rate, i.e., increases the amount and rate of removal of caustic liquor from the slurry. Addition of the flocculant reduces the amount of washing necessary to remove sodium ions from the final cake and also provides higher cake solids which results in greater production per unit time and less expenditure of energy in the drying process. Anionic polymers derived from 80 to 100% of an anionic vinyl monomer such as acrylic acid and from 20 to 0% of a nonionic vinyl monomer such as acrylamide having molecular weights between 1.5 to $12.0 \times 10^6$ are useful in deliquoring aluminum trihydroxide slurries. Anionic polymer dosages of from about 150 to about 600 ppm may be used to treat 200 ml of about 5 to about 10% by weight of aluminum trihydroxide slurry. Higher dosages are required when aluminum trihydroxide concentrations are greater than 10% by weight.

12 Claims, No Drawings

ALUMINUM TRIHYDROXIDE DELIQUORING WITH ANIONIC POLYMERS

BACKGROUND OF THE INVENTION

1. Field of the Invention

This invention relates to use of high molecular weight anionic polymers in the deliquoring of aluminum trihydroxide.

2. Description of the Prior Art

Production of chemical alumina compounds in the gel and hydrate forms is most commonly accomplished through the use of the Bayer process or the Bayer-Sinter process. The principal aluminous ore is bauxite, which is a broad term applied to any ore specie composed primarily of hydrated aluminum oxides. Monohydrates and hydrates are the chief hydrated forms and are generally found in the presence of iron, silicon and titanium oxide impurities. See Raymond E. Kirk and Othmer, D. F., Encyclopedia of Chemical Technology, Volume 1, First Edition, 1947, pages 600–602 for additional details.

In the Bayer process, bauxite ore is digested in steel autoclaves or tubular reactors with hot aqueous caustic soda. The result is the formation of sodium aluminate from the reaction of the caustic soda with the monohydrated and trihydrated forms of the aluminum oxides:

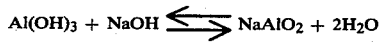
$$Al(OH)_3 + NaOH \rightleftharpoons NaAlO_2 + 2H_2O$$

$$AlO(OH) + NaOH \rightleftharpoons NaAlO_2 + H_2O$$

See Raymond E. Kirk and Othmer, D. F., Encyclopedia of Chemical Technology, Volume 2, 1978, pages 140–143.

After digestion, the second step in the refining of bauxite is removal of the insoluble metal oxide impurities and sodium aluminum silicates. In the Bayer-Sinter process (used where the ore has a high silica content), the sodium aluminum bound with silicates is further treated with limestone and soda ash to produce a dicalcium silicate and free the sodium aluminate for recovery.

These impurities or "red-muds" are difficult to remove because of their small particle size. In many operations chemical additives such as high molecular polymers and natural starches are added to flocculate the impurities and provide faster settling and cleaner supernatant liquors. The impurities are then washed in a continuous counter current decantation.

After all impurities have been removed through washing and filtration, the filtered liquors are cooled and precipitated. Sodium aluminate is hydrolyzed to yield a slurry of aluminum trihydroxide and caustic liquor:

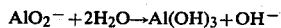
$$AlO_2^- + 2H_2O \rightarrow Al(OH)_3 + OH^-$$

To speed the precipitation process, the aluminate liquor is seeded with fine crystals washed from previous precipitations. This seeding facilitates easier washing and separation by effecting larger crystal growth.

Once the aluminum trihydroxide is precipitated, it is processed through a series of mechanical deliquoring and repulping steps where wash water is applied to remove excess sodium ion from $Al(OH)_3$ filter cakes before drying. Rotary drum vacuum filters are most frequently used, although belt filters and centrifuges are possible alternatives. The aluminum trihydroxide cakes produced from the dewatering steps are fed to dryers where calcination of the product takes place.

SUMMARY OF THE INVENTION

During the final stages of $Al(OH)_3$ production, deliquoring the aluminum trihydroxide slurry of excess sodium ions in the form of caustic liquor is conventionally achieved by numerous water washes prior to drying the product. Addition of an effective amount of a highly charged anionic polymer flocculant of high molecular weight improves the filtration rate, i.e., increases the amount and rate of removal of caustic liquor from the aluminum trihydroxide slurry. Addition of the flocculant reduces the amount of washing necessary to remove sodium ions from the final cake and also provides higher cake solids which results in greater production per unit time and less expenditure of energy in the drying process. Anionic polymers derived from 80 to 100% anionic vinyl monomer such as acrylic acid and from 20 to 0% nonionic vinyl monomer such as acrylamide having molecular weights between 1.5 to $12.0 \times 10^6$ are useful in deliquoring aluminum trihydroxide slurries. Dosages of from about 150 to about 660 ppm of anionic polymer may be used to treat 200 ml of aluminum trihydroxide slurry having from about 5 to about 10% by weight of aluminum trihydroxide. Higher dosages are required when the aluminum trihydroxide concentration is greater than about 10%.

DETAILED DESCRIPTION

Preparation of high molecular weight anionic polymers and copolymers are well known and described in numerous publications and patents. These anionic polymers are most commonly prepared via aqueous solution, non-aqueous media and emulsion polymerization techniques. The final form of the polymer may be as a solid powder, aqueous solution at low concentrations (<10%) or in a nonaqueous solution at low concentrations (<2.0%) with a solvent for the polymer such as dioxane, methanol, ethanol, 2-propanol, dimethyl formamide or the like. Also the polymer may be in the form of a gel which is a very high polymer concentration in water (>10%) and in the form of a water-in-oil emulsion. Mark, H. F., Gaylord, N. G., Bikales, N. M., Encyclopedia of Polymer Science and Technology, Volume 1, 1964, pages 197–226 describe acrylic acid polymers and their preparation in greater detail.

The effective monomer composition in anionic polymers for use in the deliquoring of aluminum trihydroxide varies over a wide range, i.e., about from 80 to 100% anionic monomer and 0 to 20% nonionic monomer. The preferred anionic monomer concentration in the polymer is between 90 to 100% by weight. The most useful anionic polymer molecular weight range is between 1.5 to $12.0 \times 10^6$ with the optimum range being between 3.0 to $5.0 \times 10^6$.

Useful water soluble nonionic vinyl monomers include acrylamide, methacrylamide, allyl alcohol, 3-methylallyl alcohol, vinyl chloride, vinyl methyl ether, vinyl ethyl ether and the like.

Useful water soluble anionic vinyl monomers include acrylic acid, 1,2-dichloroacrylic acid, 2-methyl-cis-acrylic acid, 2-methyl-trans-acrylic acid, ethylene sulfonic acid, fumaric acid, chlorofumaric acid, methylfumaric acid, itaconic acid, maleic acid, dichloromaleic acid, methylmaleic acid, methacrylic acid, styrene sulfonic acid, crotonic acid, 2-acrylamido-2-methyl propane sulfonic acid, their salts and the like.

Free radical yielding initiators useful as catalysts in polymerizing the above vinyl monomers, such as benzoyl peroxide, lauroyl peroxide, 2,2'-azobis (isobutyronitrile), potassium persulfate, ammonium persulfate, sodium persulfate and the like may be used in the polymerization, advantageously in amounts ranging between about 500 and about 1000 ppm by weight on the monomer(s), depending upon the solubility of the initiator. Polymerization can also be carried out using high energy irradiation such as high energy electrons from a Van de Graaff accelerator, ultraviolet irradiation or the like.

Anionic homo- and copolymers can be readily prepared in aqueous solution. The monomer concentration is usually at or below 10.0% and can successfully be converted to polymer using any number of the water soluble catalysts described above. The temperature range can vary and is dependent upon the catalyst system chosen. The polymers can be used as aqueous solutions or they can be dried to flaky white solids through a number of procedures. The aqueous polymer solution can be converted into an aqueous gel state by partially drying the polymer solution. Usually the gel form of the product contains anywhere from 20 to 90% polymer.

Anionic homo- and copolymers can be prepared in nonaqueous media, such as benzene, which are solvents for the monomers, but nonsolvents for polymer. Initiation can be accomplished with initiators soluble in the medium used, such as benzoyl peroxide or azobisisobutyronitrile, or by ultraviolet light. Polymerization in benzene can be carried out as a continuous process in which monomer, initiator, and solvent are continuously added and a slurry containing polymer and unreacted ingredients is continuously removed. The product of this preparation is a free-flowing dustless powder.

Anionic homo- and copolymers can be prepared using emulsion polymerization techniques by (1) dissolving (a) a water soluble anionic vinyl monomer and or (b) a water soluble anionic vinyl monomer and a water soluble nonionic vinyl monomer in water to form an aqueous phase, (2) dissolving an emulsifying agent in a hydrophobic liquid to form an oil phase, emulsifying the aqueous phase in the oil phase to prepare a water-in-oil emulsion, polymerizing the monomers dissolved in the aqueous phase of the water-in-oil emulsion using a free radical yielding initiator as a catalyst to obtain a homopolymer of (a) or copolymer of (b) and then adding a self-inverting surfactant to the anionic water-in-oil emulsion.

The following patents are representative of polymeric water-in-oil emulsion art.

U.S. Pat. No. 3,284,393—Vanderhoff et al, issued Nov. 8, 1966, describes polymerization of vinyl monomer in the oil phase by forming a water-in-oil emulsion of the monomer in a hydrophobic liquid and water with a water-in-oil emulsifier and then polymerizing the emulsion with a free radical catalyst to obtain a polymeric latex where the oil phase is the dispersion medium.

U.S. Pat. No. 4,022,731—Schmitt, issued May 10, 1977, describes a self-inverting water-in-oil emulsion containing an acrylamide polymer in the aqueous phase, hydrocarbon oil, water-in-oil emulsifier and an inverting surfactant mixture containing two sulfosuccinates or one sulfosuccinate and an alkylphenol ethoxylate.

U.S. Pat. No. 4,022,736—Schmitt, issued May 10, 1977, describes a self-inverting water-in-oil emulsion having a copolymer of acrylic acid in the aqueous phase, hydrocarbon oil, water-in-oil emulsifier and an inverting surfactant which is a fatty alcohol ethoxylate.

U.S. Pat. No. 4,077,930—Lim et al, issued Mar. 7, 1978, describes a stable, self-inverting water-in-oil emulsion obtained by emulsifying water soluble vinyl monomer in oil containing at least 20% emulsifier and a free radical catalyst and then polymerizing to obtain a stable polymer emulsion which can be inverted by adding water without any other reagent.

Test Procedures

Because this invention deals with the enhanced deliquoring properties provided by high molecular weight anionic polymers, three test procedures to determine the performance of each of the anionic polymer flocculant compositions shown below are employed to simulate the three different types of filtering equipment which may be used during the deliquoring phase of Al(OH)$_3$ processing.

1. Standard Buchner Funnel Test.
2. Centrifuge Buchner Funnel Test.
3. Gravity Drainage Test.

The following anionic polymer compositions are useful:

| Polymer Comp. | % Active | Form | % Carboxylic | Molecular Weight ($\times 10^6$) |
| --- | --- | --- | --- | --- |
| A | 100.0 | Dry | 100 | 1–2 |
| B | 25.0 | Emulsion | 95 | 3–5 |
| C | 25.0 | Emulsion | 90 | 3–5 |
| D | 25.0 | Emulsion | 80 | 3–5 |
| E | 100.0 | Dry | 80–100 | 8–12 |

These anionic polymer compositions may be prepared as 0.1% active polymer solutions. The % polymer concentration is experimentally determined for the anionic polymer sample. A 0.1% polymer active solution is then prepared by dissolving one part of polymer, on an active basis (% active are taken to mean % polymer in the product) in 999 parts of tap water.

The aluminum trihydroxide slurry was obtained from a commercial source and used as received. Its properties were:

% Solids = 7.1
pH = 12.5

For a fuller understanding of the nature and advantages of this invention, reference may be made to the following examples. These examples are given merely to illustrate the invention and are not to be construed in a limiting sense. All quantities, proportions and percentages are by weight and all references to temperature are °F. unless otherwise indicated.

EXAMPLE I

The Standard Buchner Funnel Test procedure was designed to determine the performance of the different compositions when vacuum filtration is used in the deliquoring process.

Test Equipment

An open-ended 300 ml graduated cylinder mounted on a ring stand with a stopper and valve inserted in the bottom opening. A two-hole stopper inserted in the top with hole sizes sufficient to insert a 9 cm Buchner Funnel and a small tube for vacuum attachment. A variable speed mixer with an rpm range of 0-2000 equipped with marine propeller agitator.

Test Procedure

The desired dose of each Composition A through E flocculant was added to 200 mls of 160° F. aluminum trihydroxide slurry prepared by heating the slurry to 160° F. on a hot plate with stirring. The slurry was mixed for 15 seconds at 500 rpm. The conditioned slurry was poured into the Buchner funnel in which a fast filter paper (Whatman No. 4) had been placed and moistened. Then 15" Hg of vacuum was applied and the time to obtain 25 mls, 50 mls, 75 mls, 100 mls and the 10% cake end point volume of filtrate were recorded. The 10% cake end point was determined and used to standardize comparisons of flocculants added at different dosages. The 10% cake end point is calculated using the formula:

10% Cake End Point Volume =
(200 (ml) + Polymer Added (ml)) −
(% Solids of Slurry × 20) (as %)

The procedure was repeated to obtain dosage curves for each of the flocculants tested as indicated in Table I. The dosage level of choice was the one which gave the fastest dewatering rate at the 10% cake solids level.

TABLE I

| Composition | Dosage ppm | Time to Obtain Filtrate Volume (Sec.) mls | | | | 10% Cake Vol. |
|---|---|---|---|---|---|---|
| | | 30 | 50 | 75 | 100 | |
| Blank | — | 36 | 160 | | | 187 |
| A | 100 | 3 | 21 | 67 | | 76 |
| | 150 | 2 | 12 | 47 | | 73 |
| *200 | | 2 | 10 | 25 | | 33 |
| | 250 | 18 | 15 | 171 | 320 | 370 |
| B | 100 | 4 | 31 | 110 | | 125 |
| | 150 | 3 | 8 | 21 | | 34 |
| *200 | | 2 | 7 | 17 | | 26 |
| | 250 | 5 | 14 | 27 | 52 | 63 |
| C | 100 | 8 | 51 | 197 | | 223 |
| | 150 | 3 | 16 | 84 | | 153 |
| | 200 | 4 | 16 | 42 | | 90 |
| *250 | | 4 | 8 | 20 | 41 | 50 |
| | 300 | 4 | 15 | 60 | 82 | 126 |

TABLE I-continued

| Composition | Dosage ppm | Time to Obtain Filtrate Volume (Sec.) mls | | | | 10% Cake Vol. |
|---|---|---|---|---|---|---|
| | | 30 | 50 | 75 | 100 | |
| D | 200 | 9 | 66 | 275 | | 575 |
| | 300 | 2 | 14 | 59 | 195 | 360 |
| | 400 | 2 | 13 | 38 | 165 | 315 |
| | 500 | 4 | 14 | 35 | 80 | 330 |
| E | 150 | 46 | 93 | 460 | | 570 |
| | *200 | 3 | 17 | 40 | | 75 |
| | 250 | 4 | 20 | 55 | 110 | 135 |
| | 300 | 32 | 95 | 120 | 370 | 500 |

*Indicates optimum dosage
Slurry: % Solids = 7.1; pH = 12.5.

EXAMPLE II

The Centrifuge Buchner Funnel Test procedure illustrates the effectiveness of Compositions A–C and E as flocculants for use on high shear deliquoring devices such as centrifuges.

Test Equipment

An open-ended 300 ml graduated cylinder with a stopper and a valve inserted in the bottom opening was mounted on a ring stand. A one-hole stopper was inserted in the top of the cylinder with a hole size sufficient to insert a 9 cm Buchner Funnel. The slurry was mixed using a variable speed mixer with an rpm range of 0-2000 equipped with a marine propeller agitator.

Test Procedure

Most centrifuge applications require that the polymer being applied to the slurry produce a large, shear stable floc, quickly.

A 200 ml aliquot of 160° F. aluminum trihydroxide slurry using the appropriate polymer dosage determined in Example I was mixed for 15 seconds at increasing rpm speeds (500, 750, 1000 and 1500 rpm). The treated slurry was poured into the Buchner Funnel equipped with a moistened No. 4 Whatman filter paper. Drainage time was recorded at the 30, 50, 75 and 100 ml and the 10% cake end point volume level. Test results are shown in Table II.

TABLE II

| Composition | Optimum Dosage (ppm) | Mix Speed (rpm) | Time to Obtain Filtrate Volume (Seconds) mls | | | | 10% Cake Volume | Supernatant Clarity |
|---|---|---|---|---|---|---|---|---|
| | | | 30 | 50 | 75 | 100 | | |
| Blank | — | 500 | 36 | 160 | — | — | 187 | clear |
| A | 200 | 500 | 2 | 10 | 25 | — | 33 | clear |
| | | 750 | 2 | 6 | 18 | — | 38 | clear |
| | | 1000 | 2 | 5 | 10 | — | 16 | flocced solids in filtrate |
| B | 200 | 500 | 2 | 7 | 17 | — | 26 | clear |
| | | 750 | 5 | 8 | 17 | — | 26 | clear |
| | | 1000 | 2 | 12 | 17 | — | 26 | clear |
| | | 1500 | 3 | 5 | 10 | — | 16 | flocced solids in filtrate |
| C | 250 | 500 | 4 | 8 | 20 | 41 | 50 | clear |
| | | 750 | 3 | 7 | 15 | 27 | 33 | clear |
| | | 1000 | 3 | 6 | 12 | 20 | 30 | clear |
| | | 1500 | 3 | 6 | 10 | 16 | 25 | flocced solids in filtrate |
| E | 200 | 500 | 3 | 17 | 40 | — | 75 | clear |
| | | 750 | 4 | 15 | 29 | — | 52 | clear |
| | | 1000 | 4 | 17 | 25 | — | 49 | clear |
| | | 1500 | 3 | 15 | 26 | — | 48 | clear |

Slurry % Solids = 7.1;
pH = 12.5.

EXAMPLE III

The Gravity Drainage Test procedure is designed to test the effectiveness of Compositions A–E as flocculants for use on gravity drainage deliquoring devices such as belt presses.

Test Equipment

The treated slurry was mixed with a variable speed mixer with an rpm range of 0–2000 equipped with a marine propeller agitator and filtered through a 325 mesh U.S. Standard sieve.

Test Procedure

The desired dosage of each composition A through E flocculant was applied to 100 mls of 160° C. aluminum tirhydroxide slurry, mixed at 400 rpm and filtered by pouring through a 325 mesh U.S. Standard sieve. The filtrate volume obtained in 5, 10, 10, 30 and 60 seconds was recorded. Theoretical percent cake was calculated for time=5 seconds as follows:

$$\% \text{ Cake at Time} = \left[ \frac{\text{Sample size (ml)} \times \% \text{ Solids (as decimal)}}{\text{Sample size (ml)} + \text{(ml) of flocculant}} - \text{Filtrate(ml)} \times 100 \right]$$

where Time=5 seconds

Dosage Curves were run for each composition to determine optimum dosage shown in Table III.

TABLE III

| Composition | Dosage (ppm) | Filtrate Volume Obtained (Seconds) | | | | | % Cake at Time = 5 Sec. | Supernatant Clarity |
|---|---|---|---|---|---|---|---|---|
| | | 5 | 10 | 20 | 30 | 60 | | |
| Blank | — | 98 | 98 | 99 | 99 | 100 | No-cake formed | all solids in filtrate |
| A | 150 | 36 | 48 | 52 | 56 | 66 | 9.0 | flocced solids in filtrate |
| | 200 | 60 | 68 | 74 | 76 | 80 | 11.8 | flocced solids in filtrate |
| | *250 | 72 | 78 | 82 | 85 | 88 | 13.4 | clear |
| | 300 | 74 | 80 | 85 | 87 | 90 | 12.7 | clear |
| | 350 | 84 | 90 | 95 | 97 | 100 | 13.9 | clear |
| | 400 | 84 | 92 | 98 | 101 | 105 | 12.7 | clear |
| B | 100 | 38 | 46 | 50 | 54 | 58 | 9.9 | flocced solids in filtrate |
| | *250 | 76 | 80 | 83 | 84 | 86 | 14.5 | clear |
| | 300 | 80 | 83 | 86 | 87 | 90 | 14.2 | clear |
| | 350 | 80 | 87 | 89 | 90 | 93 | 12.9 | clear |
| | 400 | 89 | 94 | 98 | 100 | 102 | 13.9 | clear |
| C | 100 | 42 | 50 | 56 | 58 | 65 | 10.4 | flocced solids in filtrate |
| | 200 | 68 | 73 | 76 | 78 | 82 | 13.7 | flocced solids in filtrate |
| | 250 | 68 | 71 | 74 | 76 | 80 | 12.5 | clear |
| | *300 | 74 | 79 | 82 | 84 | 88 | 12.7 | clear |
| | 350 | 77 | 84 | 90 | 94 | 96 | 12.2 | clear |
| | 400 | 78 | 86 | 91 | 93 | 96 | 11.5 | clear |
| D | 250 | 42 | 48 | 56 | 60 | 69 | 8.6 | flocced solids in filtrate |
| | 300 | 56 | 70 | 76 | 81 | 87 | 9.6 | flocced solids in filtrate |
| | 350 | 65 | 75 | 85 | 89 | 94 | 10.1 | flocced solids in filtrate |
| | 400 | 75 | 85 | 92 | 95 | 100 | 10.9 | clear |
| | 500 | 88 | 94 | 99 | 100 | 104 | 11.5 | clear |
| | *600 | 103 | 108 | 112 | 114 | 117 | 12.5 | clear |
| E | 150 | 36 | 44 | 50 | 54 | 60 | 9.0 | flocced solids in filtrate |
| | 200 | 60 | 66 | 72 | 74 | 76 | 11.8 | flocced solids in filtrate |
| | 250 | 68 | 74 | 76 | 80 | 83 | 12.5 | flocced solids in filtrate |
| | 300 | 66 | 72 | 76 | 78 | 82 | 11.1 | flocced solids in filtrate |
| | *350 | 85 | 86 | 88 | 90 | 94 | 14.2 | clear |
| | 400 | 84 | 90 | 94 | 95 | 98 | 12.7 | clear |

*Optimum in Dosage
Slurry % Solids = 7.1;
pH = 12.5.

While the invention has been described with reference to certain specific embodiments thereof, it is understood that it is not to be so limited since alterations and changes may be made therein which are within the full intended scope of the appended claims.

What is claimed is:

1. In the Bayer process of deliquoring aluminum trihydroxide slurry of excess sodium ions in the form of caustic liquor by washing and filtering after the precipitation steps, the improvement comprising adding to the slurry an effective amount of anionic polymer selected from the group consisting of homopolymers and copolymers having from about 80 to 100% by weight of anionic vinyl monomer and from about 20 to 0% by weight of nonionic vinyl monomer and a molecular weight of from about $1.5 \times 10^6$ to about $12.0 \times 10^6$ to improve rate of filtration.

2. The process of claim 1 wherein the anionic vinyl monomer in the anionic polymer is selected from the group consisting of acrylic acid, 1,2-dichloroacrylic acid, 2-methyl-cis-acrylic acid, 2-methyl-trans-acrylic acid, ethylene sulfonic acid, fumaric acid, chlorofumaric acid, methylfumaric acid, itaconic acid, maleic acid, dichloromaleic acid, methylmaleic acid, methacrylic acid, styrene sulfonic acid, crotonic acid, 2-acrylamido-2-methyl propane sulfonic acid and their salts and the nonionic vinyl monomer in the anionic polymer is selected from the group consisting of acrylamide, methacrylamide, allyl alcohol, 3-methylallyl alcohol, vinyl chloride, vinyl methyl ether and vinyl ethyl ether.

3. The process of claim 1 wherein the anionic vinyl monomer in the anionic polymer is acrylic acid and the nonionic vinyl monomer in the anionic polymer is acrylamide.

4. The process of claim 1 wherein the anionic polymer is an acrylic acid homopolymer.

5. The process of claim 1 wherein the anionic polymer is a copolymer having from about 95% to 80% by weight of acrylic acid monomer and about 5% to about 20% by weight of acrylamide monomer.

6. The process of claim 1 wherein from about 5 to about 10% by weight of aluminum trihydroxide is present in the slurry.

7. The process of claim 6 wherein from about 150 to about 600 ppm of anionic polymer per 200 ml of slurry is added.

8. The process of claim 1 wherein the anionic polymer molecular weight is from about $3 \times 10^6$ to about $5 \times 10^6$.

9. The process of claim 1 wherein the anionic monomer in the anionic polymer is between 90 and 100% by weight.

10. The process of claim 1 wherein the anionic polymer is in the form of an emulsion.

11. The process of claim 1 wherein the anionic polymer is in the form of a liquid.

12. The process of claim 1 wherein the anionic polymer is in the form of a powder.

* * * * *